United States Patent
Kannan et al.

(10) Patent No.: US 9,437,011 B2
(45) Date of Patent: Sep. 6, 2016

(54) METHOD AND APPARATUS FOR ESTIMATING A POSE OF A HEAD FOR A PERSON

(71) Applicant: Samsung Electronics Co., Ltd., Suwon-si (KR)

(72) Inventors: Hariprasad Kannan, Bangalore (IN); Anant Vidur Puri, Chandigarh (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 190 days.

(21) Appl. No.: 13/908,282

(22) Filed: Jun. 3, 2013

(65) Prior Publication Data
US 2013/0329951 A1  Dec. 12, 2013

(30) Foreign Application Priority Data

Jun. 11, 2012 (IN) .......................... 2302/CHE/2012
Jan. 4, 2013 (KR) ....................... 10-2013-0001259

(51) Int. Cl.
*G06K 9/00* (2006.01)
*G06T 7/20* (2006.01)
*G06T 7/00* (2006.01)

(52) U.S. Cl.
CPC ......... *G06T 7/2046* (2013.01); *G06K 9/00261* (2013.01); *G06K 9/00281* (2013.01); *G06T 7/0046* (2013.01); *G06T 2207/10016* (2013.01); *G06T 2207/30201* (2013.01)

(58) Field of Classification Search
CPC ............ G06K 9/00281; G06T 7/0046; G06T 7/2046; G06T 2207/10016; G06T 2207/30201

USPC .......................................................... 382/103
See application file for complete search history.

(56) References Cited

U.S. PATENT DOCUMENTS

| | | | |
|---|---|---|---|
| 6,741,756 B1 | 5/2004 | Toyama et al. | |
| 6,806,898 B1 * | 10/2004 | Toyama et al. | 348/14.16 |
| 7,848,548 B1 | 12/2010 | Moon et al. | |
| 8,733,936 B1 * | 5/2014 | Kornilov | A61B 3/10 351/159.75 |
| 2003/0146921 A1 * | 8/2003 | Taniguchi et al. | 345/629 |
| 2004/0240708 A1 * | 12/2004 | Hu | G06T 3/012 382/103 |
| 2007/0160293 A1 * | 7/2007 | Ishikawa et al. | 382/181 |
| 2007/0211944 A1 * | 9/2007 | Takeguchi et al. | 382/190 |
| 2009/0179998 A1 * | 7/2009 | Steinberg et al. | 348/222.1 |
| 2009/0309878 A1 * | 12/2009 | Otani | G06K 9/00208 345/427 |
| 2010/0066822 A1 * | 3/2010 | Steinberg | G06K 9/00208 348/77 |
| 2010/0316281 A1 | 12/2010 | Lefevre | |
| 2011/0063403 A1 * | 3/2011 | Zhang | G06K 9/00261 348/14.1 |
| 2011/0188738 A1 * | 8/2011 | Roussel | G06T 17/20 382/154 |

FOREIGN PATENT DOCUMENTS

KR   10-0828411   5/2008

* cited by examiner

*Primary Examiner* — Amara Abdi
(74) *Attorney, Agent, or Firm* — NSIP Law

(57) ABSTRACT

A method of estimating a pose of a head for a person, includes estimating the pose of the head for the person based on a content, and generating a three-dimensional (3D) model of a face for the person. The method further includes generating pictorial structures of the face based on the estimated pose and the 3D model, and determining a refined pose of the head by locating parts of the face in the pictorial structures.

20 Claims, 4 Drawing Sheets

METHOD AND APPARATUS FOR ESTIMATING A POSE OF A HEAD FOR A PERSON

CROSS-REFERENCE TO RELATED APPLICATION(S)

This application claims the benefit under 35 USC 119(a) of Indian Patent Application No. 2302/CHE/2012, filed on Jun. 11, 2012, in the Indian Patent Office, and Korean Patent Application No. 10-2013-0001259, filed on Jan. 4, 2013, in the Korean Intellectual Property Office, the entire disclosures of which are incorporated herein by references for all purposes.

BACKGROUND

1. Field

The following description relates to a method and an apparatus for estimating a pose of a head for a person.

2. Description of the Related Art

As computers and electronic devices become more prevalent, attempts have been made to develop human computer interfaces to provide more personalization. Head pose estimation is an addressed problem in computer vision. The reason for this is the application potential of an accurate pose estimation system in human computer interaction. Applications in this field include emotion recognition, unobtrusive customer feedback, biological pose correction, and interactive gaze interfaces. Knowledge of the head pose is also useful in other head and face related computer vision applications including surveillance and avatar animation.

Existing methods for head pose estimation are based on three-dimensional (3D) models, machine learning techniques, and/or inferring geometry based on facial features, like eyes, nose, and mouth. These methods face challenges, like person-independent pose estimation, effects of facial expressions, and scalability to estimate poses for a crowd of people.

While 3D techniques give accurate results by constructing a model each time a subject uses the system, this might not be practical in applications, like surveillance and shopping mall displays. Machine learning techniques can better handle different subjects and facial expressions. However, machine learning techniques include challenging training pipelines requiring huge training data, and are computationally expensive during testing. Also, machine learning techniques suffer from tedious alignment issues, sensitivity to illumination, and non-scalability to estimate poses for multiple subjects.

As a result, the existing methods of estimating a head pose are not capable of dealing with agile motion and mitigating drift. Due to these drawbacks, the existing methods obtain results that are not very efficient.

SUMMARY

In one general aspect, there is provided a method of estimating a pose of a head for a person, the method including estimating the pose of the head for the person based on a content, and generating a three-dimensional (3D) model of a face for the person. The method further includes generating pictorial structures of the face based on the estimated pose and the 3D model, and determining a refined pose of the head by locating parts of the face in the pictorial structures.

In another general aspect, there is provided an apparatus that estimates a pose of a head for a person, the apparatus including a processor configured to estimate the pose of the head for the person based on a content, and generate a three-dimensional (3D) model of a face for the person. The processor is further configured to generate pictorial structures of the face based on the estimated pose and the 3D model, and determine a refined pose of the head by locating parts of the face in the pictorial structures.

Other features and aspects will be apparent from the following detailed description, the drawings, and the claims.

DETAILED DESCRIPTION

Figure 1:
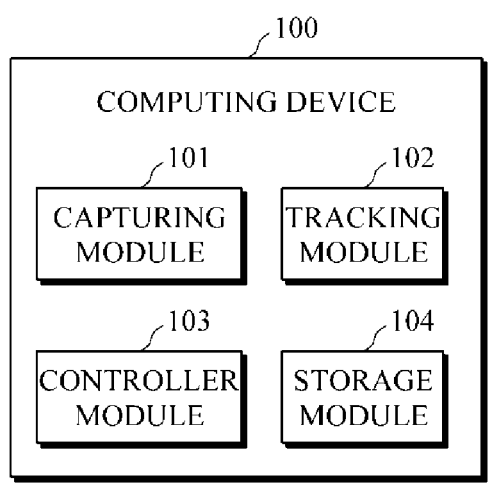
FIG. 1 is a block diagram illustrating an example of a computing device that estimates a head pose.

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. Also, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Examples describe herein include a method and an apparatus for head pose estimation based on holistic and parts-based features of a head of a subject person. The method and the apparatus use a coarse-to-fine approach, which adds robustness since a mistake at one operation is corrected later.

In more detail, the method and the apparatus obtain an image, e.g., from a video, and segment the image to locate the head. The method and the apparatus further estimate a rough pose of the head, using machine learning techniques. The method and the apparatus further construct a three-dimensional (3D) model of a face of the person based on the image. The method and the apparatus further obtain image based pictorial structures, e.g., an optimized two-dimensional (2D) model, of the face, based on the rough pose, the 3D model of the face, and predetermined models of parts for the face. The method and apparatus further locate the parts of the face, such as eyes, a nose, and mouth corners, in the image-based pictorial structures. The method and the apparatus further estimate a refined head pose based on an outline of the head, the locations of the parts of the face, and a predetermined lookup table.

In an example, the holistic features are real-time approximations of an angle of the head. The method and the apparatus use the coarse-to-fine approach in which this coarse level understanding is approximated. For example, an approximate range of the angle of the head may be approximated first to be 20-40 degrees, and an exact angle of the head may then be determined by locating the parts of the head.

FIG. 1 is a block diagram illustrating an example of a computing device 100 that estimates a head pose. Referring to FIG. 1, the computing device 100 includes a capturing module 101, a tracking module 102, a controller module 103, and a storage module 104. For example, the computing device 100 may be a computer, a mobile phone, a tablet, a personal digital assistant (PDA), and/or any other device capable of interacting with a human and known to one of ordinary skill in the art.

The capturing module 101 captures a content (e.g., an image or a video including a sequence of frames) of preference to a user. For example, the capturing module 101 may be a camera and/or any other device capable of capturing a content and known to one of ordinary skill in the art.

The tracking module 102 tracks a head of a subject person in the content.

The controller module 103 controls the other modules in the computing device 100, and determines a refined pose of the head based on the content and the tracked head. The refined pose may include a position and orientation of the head relative to a coordinate system.

The storage module 104 stores training data used in a machine learning technique, and stores a lookup table used to determine the refined pose.

Figure 2:
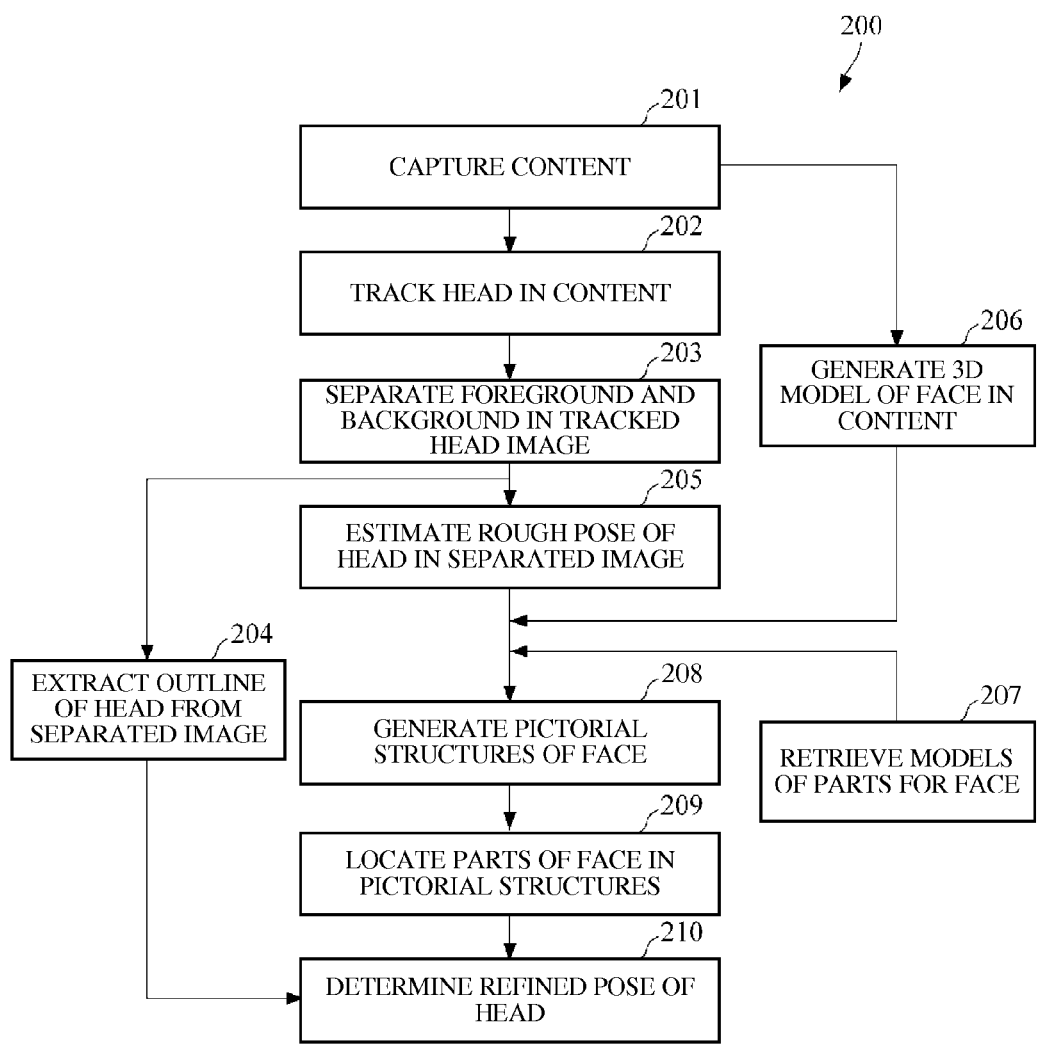
FIG. 2 is a flowchart illustrating an example of a method of estimating a head pose.

FIG. 2 is a flowchart illustrating an example of a method 200 of estimating a head pose. The method 200 of estimating a pose of a head for a subject person may be performed by the computing device, e.g., the computing device 100 of FIG. 1. Referring to FIG. 2, in operation 201, the computing device captures a content, which, e.g., may be a sequence of frames or an image. In this example, the computing device may capture the content of preference to a user, using a camera.

In operation 202, the computing device tracks a head in the content to generate an image of the tracked head, e.g., a tracked head image. For example, the computing device may include an elliptical head tracker that uses an image gradient and a color histogram to track the head, e.g., at different poses in the sequence of the frames.

In operation 203, the computing device separates a foreground and a background in the tracked head image to generate an image including the separated foreground and background, e.g., a separated image. For example, the computing device may separate the foreground and the background by cropping the tracked head image along a boundary of the tracked head, and segmenting the foreground and the background based on an image segmentation method performed on the cropped tracked head image.

In operation 204, the computing device extracts an outline of the tracked head from the separated image. For example, the computing device may extract the outline of the tracked head based on a contour following method. In another example, the computing device may extract the outline of the tracked head based on other methods of segmenting the outline of the tracked head in the separated image.

In operation 205, the computing device estimates a rough pose of the tracked head in the separated image. For example, the rough pose may include an approximate range of an angle for a pose of the tracked head. In another example, the computing device may include a learning-based system trained on abstracted images of poses for human heads (e.g., training data) that is used to estimate the rough pose. The learning-based system may include a naive Bayes classifier trained on appearance-based features of the poses that is used to estimate the rough pose. In this example, the computing device may include a database including 30 different images for each pose. The learning-based system may be trained on, e.g., abstracted images of a frontal pose, and of right and left poses that each may be an approximate range of 0-90 degrees in steps of 15 degrees from the frontal pose. Also, abstracted images of a pose including a face tilt up of 30 degrees and a pose including a face tilt down of 30 degrees may be learned.

A method of training the learning-based system may include cropping images along boundaries of respective heads, and applying a non-photorealistic rendering to the cropped images to generate abstracted images. The abstracted images may then be converted to grayscale, and may be 32×32 frames. This operation helps in normalizing locations of abstract regions across various shapes of the heads. Then, a mean and a standard deviation of pixel values for a pose of each of the converted images are computed to train a statistical model (e.g., the naive Bayes classifier) of the learning-based system. The rough pose may be estimated based on the trained learning-based system.

In operation 206, the computing device generates a 3D model of a face of the person in the content. For example, the 3D model may include eyes, a nose, mouth corners, and/or other parts of the face that is known to one of ordinary skill in the art. The 3D model may define the nose as a root part to which other parts, such as the eyes and the mouth corners, are connected. In the 3D model, the parts of the face may be spread out in three dimensions, e.g., where the eyes are at a depth with respect to the nose, and the mouth corners are at a different depth with respect to the nose. Initial edge dimensions and orientations of the 3D model may be based on generic or predetermined models of heads.

In another example, the 3D model may be personalized based on a pictorial structures fitting method performed on the captured parts of the face. The pictorial structures fitting method may build individual models of the eyes, the nose, and the mouth corners. Then, the pictorial structures fitting method may find optimal locations of these respective models, and may join these models based on the respective optimal locations to generate the 3D model. The optimal locations of the eyes, the nose, and the mouth corners may be in an image plane, and the optimal locations of the eyes and the mouth corners may be from the optimal location of the nose. The 3D model of the face may be generated by assuming that the person is showing a frontal face in which there is not any pose of the head.

In operation 207, the computing device retrieves predetermined models of parts for a face. The predetermined models may include appearance models of eyes, a nose, and mouth corners. The appearance models may be trained based on features of a Gabor filter and/or a Gaussian filter. The Gabor filter may enhance information on a pose of a head, and may eliminate distractive information.

In operation 208, the computing device generates image-based pictorial structures of the face based on the rough pose of the tracked head, the 3D model of the face, and the predetermined models of the parts for the face. In more detail, the computing device rotates the 3D model based on the rough pose, and generates the 2D model of the face on an image plane based on an orthographic projection of the rotated 3D model, as will be described with reference to FIG. 3. The computer device further assigns the appropriate predetermined models (e.g., view-based appearance models) of the parts of the face to respective nodes of the 2D model, to generate the image-based pictorial structures. For example, for a 2D model of a face with a rough pose of 30 degrees, appearance models may be assigned thereto. Based on the predetermined models, the rough pose, and the 3D model, the computing device may optimize the image-based pictorial structures.

In operation 209, the computing device locates the parts of the face in the image-based pictorial structures to obtain the best match for the image-based pictorial structures. In more detail, the computing device performs a search method to determine an exact location of each of the parts of the face, such as the eyes, the nose, and the mouth corners. For example, the computing device may determine the location of each of the eyes and the mouth corners, with respect to the location of the nose, e.g., a center of a tip of the nose. The searching method may be implemented in a real-world application since it uses a dynamic programming approach and uses a generalized distance transform to locate the parts of the face.

In operation 210, the computing device determines a refined pose of the tracked head based on the outline of the head and the location of each of the parts of the face. In more detail, the computing device determines a center of the head in the outline of the head. The computing device further averages the locations of the eyes to determine a center of the eyes, e.g., a nose bridge. Similarly, the computing device further averages the locations of the mouth corners to determine a center of a mouth of the face. Further, the computing device determines a distance and a rotation from the center of the head to the center of each of the eyes, the tip of the nose, and the mouth. In other words, the computing device determines a vector from the center of the head to the center of each of the eyes, the nose, and the mouth. The computing device includes a predetermined lookup table populated offline with various poses, each of which are mapped to distances and rotations of three vectors from the center of the head to the respective centers of the eyes, the nose, and the mouth. The computing device further retrieves the refined pose from the lookup table based on the determined distances and rotations of the three vectors from the center of the head to the center of the eyes, the nose, and the mouth, respectively, that are mapped to the refined pose. In an example, the look-up table may include images of the poses with markings for eyes, noses, and mouth corners.

The various operations in the method 200 may be performed in the order presented, in a different order, or simultaneously. Further, in examples, the operations listed in FIG. 2 may be omitted.

Figure 3:
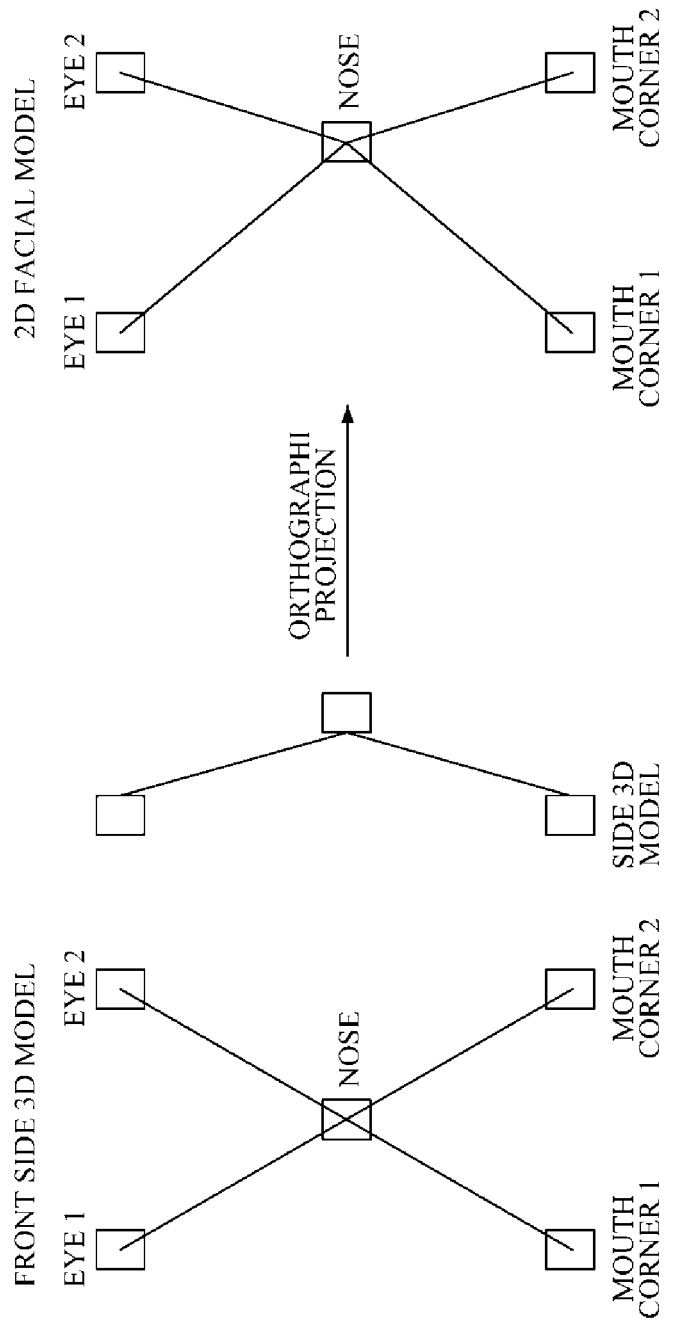
FIG. 3 is a diagram illustrating an example of a method of generating pictorial structures based on a rough head pose

FIG. 3 is a diagram illustrating a method of generating pictorial structures based on a rough head pose. Referring to FIG. 3, a front side 3D model of a face of a subject person includes eyes 1 and 2, a nose, and mouth corners 1 and 2. The 3D model is rotated based on the rough pose to generate a side 3D model of the face, and an orthographic projection is performed on the side 3D model to generate a 2D facial model (e.g., the pictorial structures) of the face on an image plane. The orthographic projection (or orthogonal projection) is a method of representing a three-dimensional object in two dimensions. It is a form of a parallel projection, where all projection lines are orthogonal to a projection plane, resulting in every plane of a scene appearing in an affine transformation on a viewing surface. Thus, the 3D model is represented in 2D by the orthographic projection.

Figure 4:
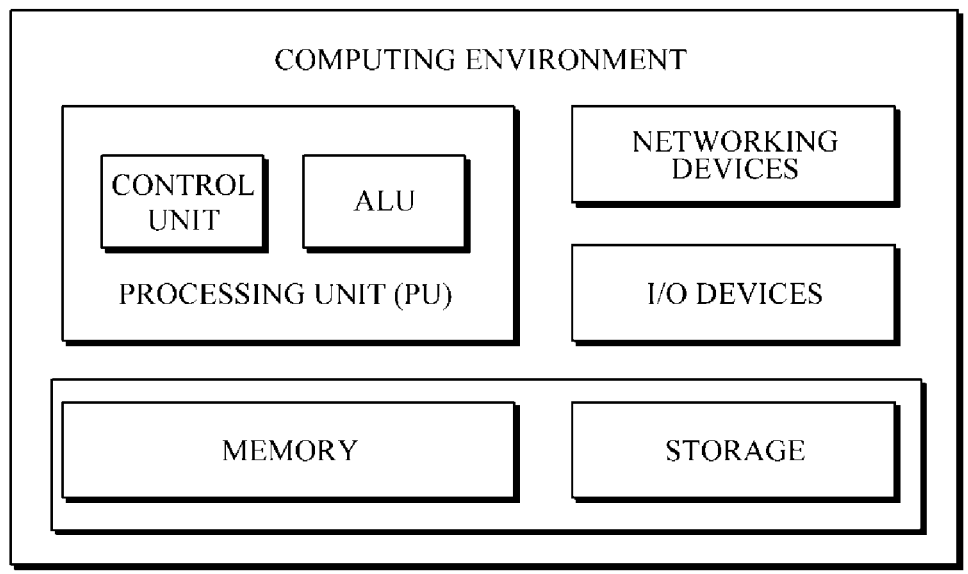
FIG. 4 is a block diagram illustrating an example of a computing environment that estimates a head pose.

FIG. 4 is a block diagram illustrating an example of a computing environment that estimates a head pose. Referring to FIG. 4, the computing environment includes at least one processing unit (PU) equipped with a control unit and an arithmetic logic unit (ALU), a memory, a storage (unit), one or more networking devices (e.g., a networking unit), and one or more input/output (I/O) devices (e.g., an I/O unit).

The processing unit processes instructions of a method. The processing unit further receives commands from the control unit to perform the processing of the instructions. Further, any logical and arithmetic operations involved in the processing of the instructions are computed with the help of the ALU.

The overall computing environment may include multiple homogeneous and/or heterogeneous cores, multiple central processing units (CPUs) of different kinds, media, and other accelerators. Further, the at least one processing unit may be located on a single chip or over multiple chips.

The method including the instructions and codes needed for implementation may be stored in the memory, the storage, or both. At a time of execution, the processing unit may fetch and execute the instructions from the corresponding memory and/or storage.

In hardware implementations, various networking devices or external I/O devices may be connected to the computing environment to support the implementation through the networking unit and the I/O unit.

In an example, the head pose estimation may be integrated into a mobile platform, and may be used in applications, like video games, augmented reality, and video chat. In another example, the head pose estimation may be used as a part of a smart television (TV) that analyzes a behavior of a person while watching the TV.

In an example, based on a determined refined pose of a head of a subject person, it may be easy to infer an interest or disinterest of the person. In another example, a determined refined pose of a head of a subject person may be used to infer emotions of the person. In still another example, a determined refined pose of a head of a subject person may be used in a retail sector, e.g., in a large format display, to analyze poses of heads for a crowd of people and determine a number of the people watching the display.

The various units, modules, and methods described above may be implemented using one or more hardware components, one or more software components, or a combination of one or more hardware components and one or more software components.

A hardware component may be, for example, a physical device that physically performs one or more operations, but is not limited thereto. Examples of hardware components include microphones, amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may include various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions that control a processing device to implement a software component may include a computer program, a piece of code, an instruction, or some combination thereof, that independently or collectively instructs or configures the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments that implement the examples disclosed herein can be easily constructed by a programmer skilled in the art to which the examples pertain based on the drawings and their corresponding descriptions as provided herein.

As a non-exhaustive illustration only, a device described herein may be a mobile device, such as a cellular phone, a personal digital assistant (PDA), a digital camera, a portable game console, an MP3 player, a portable/personal multimedia player (PMP), a handheld e-book, a portable laptop PC, a global positioning system (GPS) navigation device, a tablet, a sensor, or a stationary device, such as a desktop PC, a high-definition television (HDTV), a DVD player, a Blue-ray player, a set-top box, a home appliance, or any other device known to one of ordinary skill in the art that is capable of wireless communication and/or network communication.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of estimating a refined pose of a head for a person,
the method comprising:
estimating a rough pose of the head for the person based on a two-dimensional (2D) image;
generating a three-dimensional (3D) model of a face for the person;
rotating the 3D model based on the estimated rough pose;
determining parts of the face from the rotated 3D model;

projecting the rotated 3D model and the determined parts of the face to a 2D model; and
determining the refined pose of the head based on the 2D model.

2. The method of claim 1, further comprising:
capturing the 2D image of preference to a user, the 2D image comprising a video and/or an image.

3. The method of claim 1, further comprising:
tracking the head in the 2D image to generate a tracked head image; and
separating a foreground and a background in the tracked head image to generate a separated image.

4. The method of claim 3, further comprising:
extracting the outline of the tracked head from the separated image.

5. The method of claim 3, further comprising:
estimating the rough pose of the tracked head in the separated image.

6. The method of claim 1, further comprising:
generating the 3D model based on a personalization of a predetermined model of a head.

7. The method of claim 1, further comprising:
determining locations of the determined parts of the face with respect to a root part of the face.

8. The method of claim 1, further comprising:
determining vectors from a center of the head to respective centers of the determined parts based on an outline of the head; and
determining the refined pose based on the vectors mapped to the refined pose in a predetermined lookup table.

9. A non-transitory computer-readable storage medium storing a program comprising instructions to cause a computer to perform the method of claim 1.

10. An apparatus that estimates a refined pose of a head for a person, the apparatus comprising:
a processor configured to
estimate a rough pose of the head for the person based on a two-dimensional (2D) image,
generate a three-dimensional (3D) model of a face for the person,
rotate the 3D model based on the estimated rough pose,
determine parts of the face from the estimated rotated 3D model,
project the rotated 3D model and the determined parts of the face to a 2D model, and
determine the refined pose of the head based on the 2D model.

11. The apparatus of claim 10, wherein the processor is further configured to:
capture the 2D image of preference to a user, the 2D image comprising a video and/or an image.

12. The apparatus of claim 10, wherein the processor is further configured to:
track the head in the 2D image to generate a tracked head image; and
separate a foreground and a background in the tracked head image to generate a separated image.

13. The apparatus of claim 12, wherein the processor is further configured to:
extract an outline of the tracked head from the separated image.

14. The apparatus of claim 12, wherein the processor is further configured to:
estimate the rough pose of the tracked head in the separated image.

15. The apparatus of claim 10, wherein the processor is further configured to:
generate the 3D model based on a personalization of a predetermined model of a head.

16. The apparatus of claim 10, wherein the processor is further configured to:
determine locations of the determined parts of the face with respect to a root part of the face.

17. The apparatus of claim 10, wherein the processor is further configured to:
determine vectors from a center of the head to respective centers of the determined parts based on an outline of the head; and
determine the refined pose based on the vectors mapped to the refined pose in a predetermined lookup table.

18. The method of claim 1, further comprising determining the refined pose based on an outline of the head.

19. The apparatus of claim 10, wherein the processor is further configured to: determine the refined pose based on an outline of the head.

20. The method of claim 1, wherein the rough pose comprises an approximate range of an angle of the head.

* * * * *